United States Patent [19]

Mallin

[11] 3,735,981
[45] May 29, 1973

[54] EXERCISER ADAPTOR STAND FOR DETACHABLY RECEIVING THE REAR PORTION OF A BICYCLE

[76] Inventor: Sidney Mallin, 236 Kingston Row, Winnipeg, Manitoba, Canada

[22] Filed: Dec. 23, 1971

[21] Appl. No.: 211,410

[52] U.S. Cl...................................272/73, 211/22
[51] Int. Cl. ..............................................A63b 69/16
[58] Field of Search .........................272/73; 211/22

[56] References Cited

UNITED STATES PATENTS

| 431,740 | 7/1890 | Curtis | 211/22 |
|---|---|---|---|
| 2,043,977 | 6/1936 | Back | 272/73 |
| 2,534,967 | 12/1950 | Hapman | 272/73 |
| 3,107,915 | 10/1963 | Looney | 272/73 |

OTHER PUBLICATIONS

"Bike Exerciser You Can Build," Popular Science Monthly, October, 1967, pp. 176–177.

Primary Examiner—Anton O. Oechsle
Assistant Examiner—R. T. Stouffer
Attorney—Stanley G. Ade

[57] ABSTRACT

Two identical mounting brackets are connected to the back axle of a bicycle, one on each side of the bicycle frame. Two complementary mounting bracket sockets are located at the top of the stand of an exerciser adaptor stand for a bicycle. The bicycle is connected to the stand by pivoting the mounting bracket sockets onto the mounting brackets, and disconnected from the stand by pivoting the mounting bracket sockets off of the mounting brackets.

This mating arrangement of the mounting brackets and the sockets of the adaptor stand eliminates the need for a tool each time the stand is secured to the bicycle and disconnected from the bicycle.

4 Claims, 7 Drawing Figures

Patented May 29, 1973

3,735,981

EXERCISER ADAPTOR STAND FOR DETACHABLY RECEIVING THE REAR PORTION OF A BICYCLE

BACKGROUND OF THE INVENTION

The purpose of an exerciser adaptor stand for a bicycle is to raise the back wheel of a bicycle above the surface on which the bicycle is situated, so that said bicycle's back wheel is not in contact with said surface.

It is common with exerciser adaptor stands to connect them to bicycles by means of slots located at the top of the stands which engage the back axles of the bicycles, and to secure said stands in position by means of the axle nuts. This is not satisfactory because it entails the use of a tool each time the stand is secured to the bicycle and disconnected from the bicycle.

The present device is distinguishable from other inventions in that, subsequent to disconnecting the mounting brackets to a bicycle, said bicycle can be manually secured to an exerciser adaptor stand that has been provided with mounting bracket sockets, and manually disconnected from said stand.

SUMMARY OF THE INVENTION

This invention relates to new and useful improvements in the means of securing exerciser adaptor stands for bicycles to bicycles.

It is common in such devices to connect the exerciser adaptor stand to the bicycle by sliding the back wheel axle of the bicycle into slots that are located at the top of the stand, and to secure the bicycle to the stand by means of the back axle nuts.

This is not particularly satisfactory because this procedure requires the use of a tool each time the stand is connected to the bicycle, and each time that the bicycle is disconnected from the stand.

The present device overcomes these disadvantages by providing two brackets that are permanently connected to the back axle of a bicycle, and two sockets which are permanently connected to the uppermost parts of an exerciser adaptor stand. The brackets and sockets provide the means to connect the stand to the bicycle without the use of a tool. Furthermore the brackets and sockets provide the means to unlock the stand from the bicycle, without the use of a tool.

An object of the invention is to provide a device which will reduce the time and effort required each time an exerciser adaptor stand is secured to a bicycle, and/or each time the stand is removed from the bicycle.

Another object of the invention is to provide a device whereby an exerciser adaptor stand can be manually secured to a bicycle, and manually disconnected from the bicycle.

A yet further object of the invention is to provide a device of the character herewithin described which is simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

In the drawings like characters of reference indicate corresponding parts in the different figures.

DETAILED DESCRIPTION

Proceeding therefore to describe the invention in detail, the invention consists of two mounting brackets 11, and two mounting bracket sockets 31. The brackets 11 are made of metal or other suitable material. The sockets 31 are made of steel tube or other suitable material.

Figure 1:
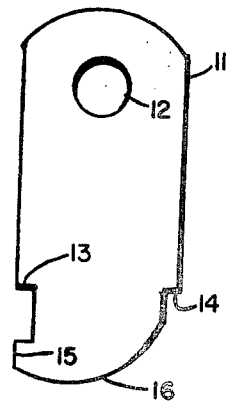
FIG. 1 is a side view of a mounting bracket.
Figure 2:
FIG. 2 is a front view of a mounting bracket.
Figure 3:
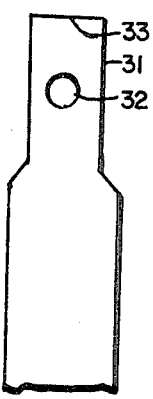
FIG. 3 is a front view of a mounting bracket socket.
Figure 4:
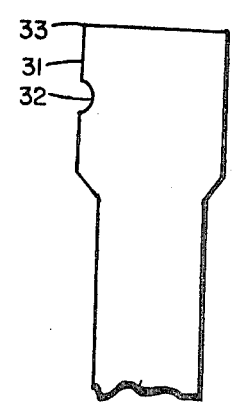
FIG. 4 is a side view of a mounting bracket socket.
Figure 5:
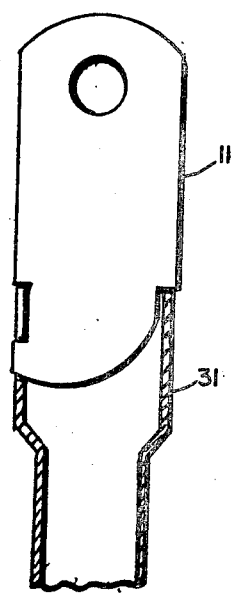
FIG. 5 is a center cross section of FIG. 3 with FIG. 1 positioned on it.
Figure 6:
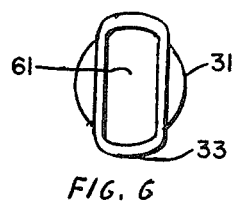
FIG. 6 is a top view of a mounting bracket socket.

In the embodiment shown on the drawings, the top portions of the two steel tube risers 76 of an exerciser adaptor stand 71 are formed into mounting bracket sockets 31. FIG. 1 shows the bracket 11 as a solid flat metal body, with an axle opening 12, shoulders at 13 and 14, a locking lug 15, and a curved edge 16. FIGS. 3 and 4 show the socket 31 as a hollow metal tube formed to receive a bracket 11, with a lug opening 32, and a pivot point 33. FIG. 6 shows the socket 31 with the opening 61 into which the lower narrower part of the bracket 11 enters the socket 31.

Two mounting brackets 11 are installed on the back axle 74 of a bicycle, one on either side of the back forks 73 of the bicycle between the forks 73 and the nuts 75 which secure the back wheel 72 to the bicycle.

In use, the bicycle is placed with the curved edges 16 of the brackets 11 on the top of the sockets 31 that are on the risers 76 of the exerciser adaptor stand 71. The risers 76 are moved so that the sockets 31 pivot on the curved edges 16 until the shoulders 13 come in contact with the pivot points 33. The risers 76 are then moved, pivoting on the pivot points 33 and the shoulders 13 until the locking lugs 15 enter the lug openings 32, and the shoulders 13 and 14 are resting on top of the socket 31.

Figure 7:
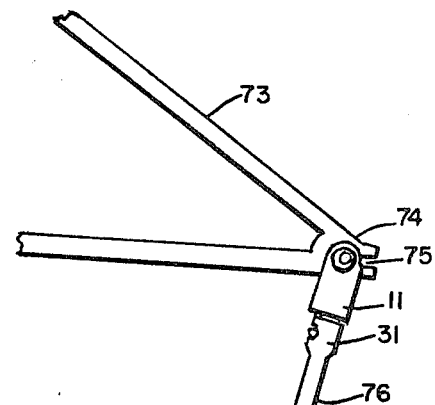
FIG. 7 is a side view of an exerciser adaptor stand for a bicycle, the back part of a bicycle mounted on it.

The wheel 72 of the bicycle connected to the stand 71 is held, by the stand 71, above the surface on which the bicycle and the stand are situated. Resistance to the turning of the wheel 72 can be applied. One method, as shown in FIG. 7, has an adjusting bolt and wing nut 78 a roller 79 mounted in a carrier 79' which is connected to, and pivots on, the stand 71.

The exerciser adaptor stand 71 is disconnected from the brackets 11 that are on the bicycle, by moving the risers 76 so that the pivot points 33 pivot on the shoulders 13 until the locking lugs 15 are disengaged from the lug openings 32, and the lower narrower parts of the brackets 11 come out of the openings 61 of the sockets 31.

Various modifications may be constructed or performed within the scope of the inventive concept disclosed. Therefore what has been set forth is intended to illustrate such concept and is not for the purpose of limiting protection to any herein particularly described embodiment thereof.

What is claimed to be the present invention is:

1. In an exerciser adaptor stand for detachably receiving the rear portion of a bicycle, said bicycle including a rear axle, a rear wheel mounted on said axle and a back fork for supporting the axle thereon; including a base and a pair of risers extending upwardly therefrom in spaced and parallel relationship; the improvement which comprises sockets formed on the upper end of each of said risers, a locking lug aperture in the wall of each of said sockets, a bracket secured to each side of said axle and extending downwardly therefrom, said bracket including a locking lug on one side edge and a pair of shoulders one on each side edge thereof, said lug engaging said aperture in said socket, said shoulder resting on the upper ends of said sockets, each of said brackets consisting of a planar plate portion having an aperture adjacent the upper side thereof engageable over said axle, said shoulder being formed on each side edge, said locking lug being spaced below one of said shoulders, and a curved base extending upwardly from the base of the side edge upon which said locking lug is formed, towards the other said side edges.

2. The improvement according to claim 1 in which said bracket includes a lower arcuately curved edge whereby said sockets can be engaged and disengaged from said brackets by pivotal action of one of said shoulders upon the upper edge of said sockets.

3. The improvement according to claim 1 which includes means on said adaptor stand selectively engageable with the wheel of the bicycle and adjustable to vary the resistance to turning of said wheel.

4. The improvement according to claim 2 which includes means on said adaptor stand selectively engageable with the wheel of the bicycle and adjustable to vary the resistance to turning of said wheel.

* * * * *